US005491925A

United States Patent [19]
Carpenter

[11] Patent Number: 5,491,925
[45] Date of Patent: Feb. 20, 1996

[54] BAIT INSERT APPARATUS

[76] Inventor: R. Carter Carpenter, 5928 Oakwood Manor, Fridley, Minn. 55432

[21] Appl. No.: 945,247

[22] Filed: Sep. 15, 1992

[51] Int. Cl.⁶ ................................................ A01K 83/00
[52] U.S. Cl. ........................................ 43/37; 43/35; 43/36
[58] Field of Search ................................. 43/34, 35, 36, 43/37

[56] References Cited

U.S. PATENT DOCUMENTS

| | | | |
|---|---|---|---|
| 199,926 | 2/1878 | Mitchell | 43/36 |
| 330,793 | 11/1895 | Lie | 43/37 |
| 834,307 | 10/1906 | Landon . | |
| 1,467,750 | 9/1923 | Borg | 43/35 |
| 1,609,151 | 11/1926 | Bruenig | 43/37 |
| 1,672,498 | 6/1928 | Otto . | |
| 2,295,042 | 9/1942 | Llewellyn | 43/36 |
| 2,325,247 | 7/1943 | Helfenstein . | |
| 2,544,782 | 3/1951 | Fawcett | 43/36 |
| 3,410,019 | 11/1968 | Landi | 43/37 |
| 3,802,114 | 4/1974 | Diebold . | |
| 3,890,735 | 6/1975 | Serrill | 43/37 |
| 4,163,336 | 8/1979 | Carpenter . | |
| 4,656,775 | 4/1987 | Annett | 43/35 |

Primary Examiner—Kurt Rowan
Attorney, Agent, or Firm—Peterson, Wicks, Nemer & Kamrath

[57] ABSTRACT

A device (10) for catching fish is disclosed in its most preferred form including first and second housing halves (14) of identical construction which are secured together. Troughs (26,28) are formed in the abutment surface (22) of each of the housing halves (14) for longitudinal slideable receipt of a leader (36). Intersecting ports (30,32) extend in a plane perpendicular to the abutment surface (22) of each housing half (14) radially spaced from the longitudinal center axis of the housing (12). Hooks (46) are pivotably and slideably mounted on a head (40) of the leader (36). The leader (36) is longitudinally movable from a bait/stowed condition with the hooks (46) extending at an acute angle to the leader (36) generally within the port (30) and within the outer surface of the housing (12) and a retention condition with the hooks (46) extending at an acute angle to the leader (36) and extending from the port (30) beyond the outer surface of the housing (12). The leader (36) is biased into the bait/stowed condition by a spring (62) sandwiched between a stop (42) on the leader (36) and a cap (54) threadably secured to the housing (12). When the cap (54) is removed from the housing (12), the leader (36) can be moved longitudinally from the retention condition to a release condition where the hooks (46) extend at an obtuse angle to the leader (36).

28 Claims, 2 Drawing Sheets

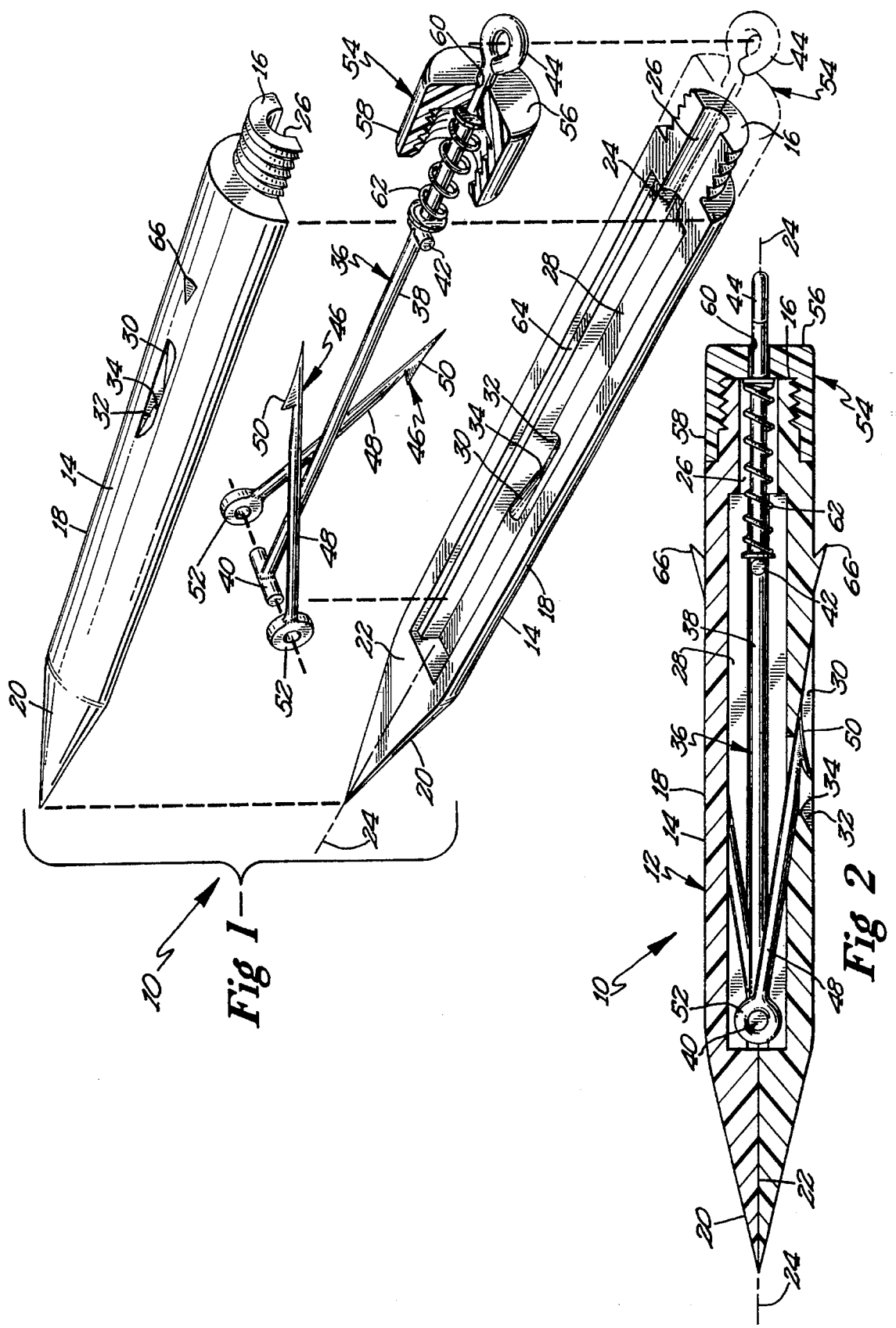

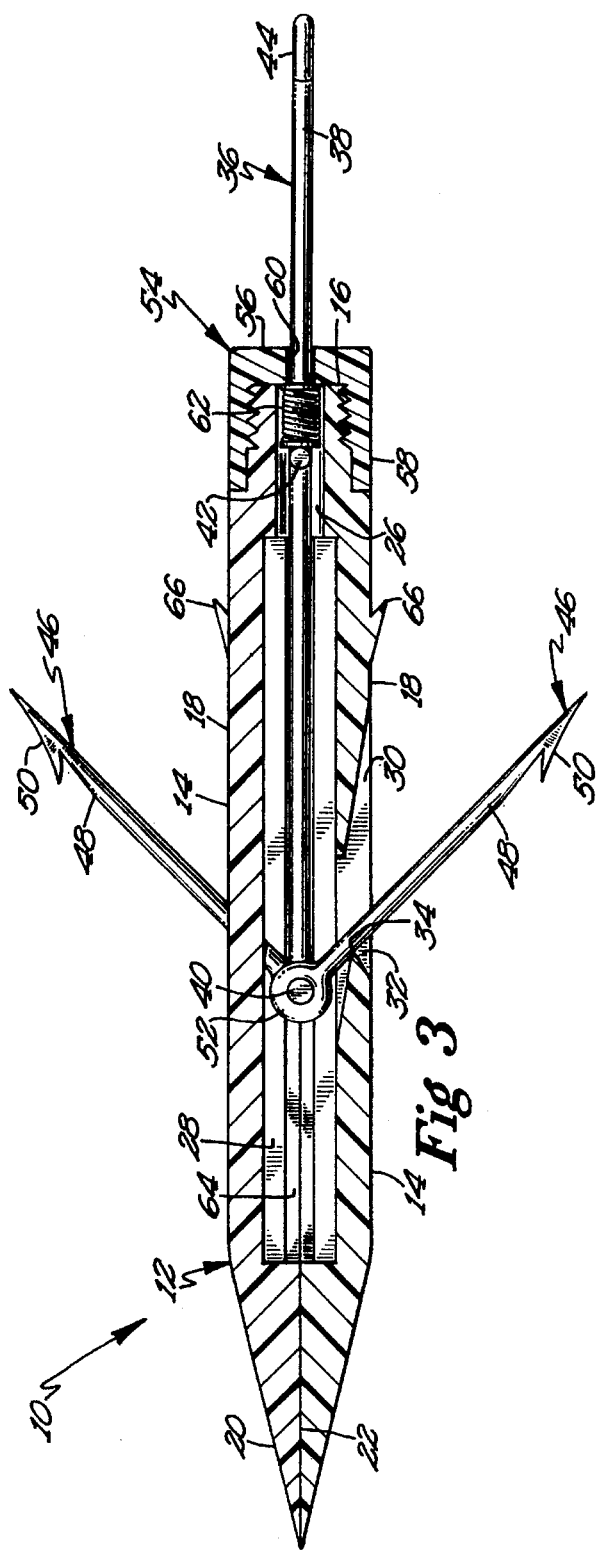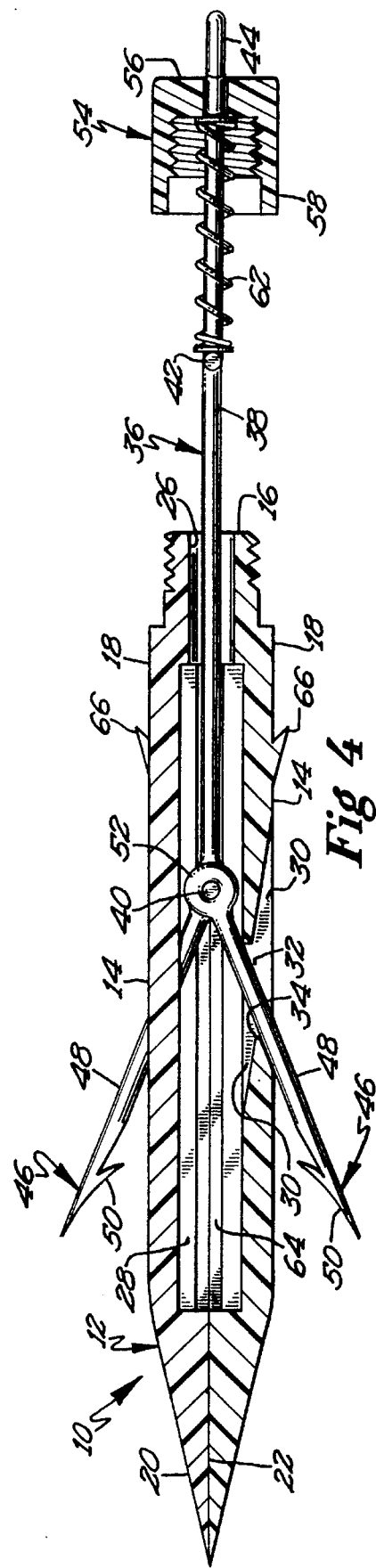

BAIT INSERT APPARATUS

BACKGROUND

The present invention generally relates to hooking devices, specifically to devices for catching fish, and particularly to fishing devices having concealed hooks and especially devices usable as bait insert apparatus.

Various types of fishing lures exist of either the artificial or bait type. Lures with concealed hooks are believed to be of a type which are particularly advantageous for a variety of reasons. One type of concealed hook lures is shown in U.S. Pat. No. 4,163,336. Although the apparatus of Pat. No. 4,163,336 provides a substantial improvement and is advantageous over other types of concealed hook lures, there exists a need to provide improvements to result in a further advantageous lure. Specifically, one area of improvement is the ability to retrieve the lure from the fish's mouth without damage to either the device or the fish so that the lure can be reused to catch further fish and so that the fish can be released in the water without detriment to its continued survival. Another area of improvement is the ability to easily and inexpensively manufacture and assemble the lure while reducing capital, production and inventory costs.

SUMMARY

The present invention solves this need and other problems in the field of devices for catching fish, lures, and bait insert apparatus by providing, in the most preferred form, hooks pivotably secured to a leader which is movably mounted with the hooks extending at an acute angle in a bait/stowed condition and/or a retention condition and with the hooks extending at an obtuse angle in a release condition.

In another aspect of the present invention, the housing for the device is formed from first and second halves, which are of identical construction in the most preferred form, with the halves each including a port extending in a plane generally perpendicular to an abutment surface which abut with the abutment surface of the other half when the halves are secured together, with at least one of the halves including a longitudinally extending trough for receipt of the leader. In the most preferred form, the leader and the ends of the hooks inside of the housing are longitudinally movable in the longitudinally extending trough, with the hooks pivoting relative to the leader with longitudinal movement of the leader.

It is thus an object of the present invention to provide a novel device for catching fish or the like.

It is further an object of the present invention to provide such a novel device wherein the hooks are movable to a release condition for retrieval from the mouth of the fish or the like without damage to either the device or the fish or the like.

It is further an object of the present invention to provide such a novel device wherein the hooks are pivotable between acute and obtuse angles relative to the leader.

It is further an object of the present invention to provide such a novel device wherein the hooks are pivotable between a bait/stowed condition at a minor acute angle approaching parallel to the leader and a retention condition at a major acute angle approaching perpendicular to the leader, with the hooks biased from the retention condition to the bait/stowed condition.

It is further an object of the present invention to provide such a novel device including a housing having a longitudinally extending trough for receipt of the leader and first and second ports extending from the trough for receipt of hooks, with the housing being formed of first and second halves having abutment surfaces which are secured together, with the ports extending in a plane generally perpendicular to the abutment surfaces. In a preferred aspect of the present invention, the hooks pivot relative to the leader when the leader is longitudinally moved in the trough.

It is further an object of the present invention to provide such a novel device wherein the housing includes a removable cap which prevents movement of the leader to the release condition with the hooks extending at an obtuse angle to the leader, with the leader being movable to the release condition upon removal of the cap.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded perspective view of a device for catching fish in the most preferred form of a bait insert apparatus according to the preferred teachings of the present invention.

FIG. 2 shows a cross-sectional view of the device of FIG. 1 in its normal bait/stowed condition.

FIG. 3 shows a cross-sectional view of the device of FIG. 1 in its fish retention condition.

FIG. 4 shows a cross-sectional view of the device of FIG. 1 in its fish release condition.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", 37 second", "front", "back", "outer", "inner", "width", "end", "side", "longitudinal", "radial", "lateral", and similar terms are used herein, it should be understood that these terms have reference only to the structure shown in the drawings as it would appear to a person viewing the drawings and are utilized only to facilitate describing the invention.

DESCRIPTION

A device for catching fish or the like according to the preferred teachings of the present invention is shown in the drawings in the most preferred form as a live or artificial bait insert apparatus and generally designated 10. In the most preferred form, device 10 includes a hook housing 12. Housing 12 includes a first generally cylindrical portion 16, a second generally cylindrical portion 18, and a third generally conical portion 20. Portions 16 and 18 each have circular cross sections of generally constant diameters, with the diameter of portion 16 being less than the diameter of portion 18. Portion 20 has circular cross sections of decreasing diameters from its interconnection to portion 18 to the free end thereof.

In the most preferred form, housing 12 is longitudinally split to form first and second identical housing halves 14 each having a planar abutment surface 22 extending longitudinally through housing 12 along the longitudinal center axis 24 of housing 12. Surface 22 of each housing half 14 includes a first trough 26 extending longitudinally along axis 24 from the free end of portion 16, through portion 16, and slightly into portion 18. Additionally, surface 22 of each housing half 14 includes a second trough 28 extending longitudinally along axis 24 from first trough 26, through portion 18, and generally to the interconnection between portions 18 and 20. Troughs 26 and 28 are of identical construction in each of housing halves 14 in the most preferred form.

Each housing half 14 of housing 12 further includes a first port 30 extending at an acute angle in the order of 8.63° from axis 24 to the outside surface of portion 18. Each housing half 14 of housing 12 in the most preferred form of the present invention further includes a second port 32 extending at an obtuse angle in the order of 218.63° from axis 24 from trough 28 to the outside surface of portion 18. Ports 30 and 32 intersect at an acute angle in the order of 60° to form a V-shaped abutment 34. Ports 30 and 32 extend from troughs 28 in a plane which is non-parallel and preferably generally perpendicular to abutment surface 22 and radially spaced from axis 24.

In the most preferred form, device 10 further includes a leader 36 for slideable receipt in troughs 26 and 28. Generally, leader 36 includes a longitudinally extending, straight, center rod 38 having a first end integrally terminating in a head 40 extending generally perpendicular to rod 38, with rod 38 extending generally intermediate the ends of head 40. In the most preferred form, head 40 has circular cross sections of generally constant size. Leader 36 further includes a spring stop 42 located generally intermediate the ends of rod 38 and extending on diametrically opposite sides of rod 38. The end of leader 36 opposite head 40 includes a loop 44 which in the preferred form is formed by bending rod 38 typically after partial assembly of device 10.

Device 10 is provided with multiple fishing hooks 46 and particularly two are shown in the most preferred form. Hooks 46 are substantially straight along their entire length having a straight shank 48 with a barb 50 at its free end and an eye 52 at its other end. In the most preferred form, eye 52 of each hook 46 is slideably and pivotably received on head 40 of leader 36. Barb 50 extends downwardly and outwardly from the free end of shank 48.

Device 10 in the most preferred form further includes a cap 54 having an annular end 56 with an integral cylindrical flange 58 extending therefrom. Flange 58 in the most preferred form has an inside surface of a size for receipt on cylindrical portion 16 and has an outside surface of a size corresponding to cylindrical portion 18. Suitable provisions are provided for removably securing cap 54 to housing 12, such as threading on the inside surface of flange 48 and on portion 16 as shown, a snap interlock between cap 54 and portion 16, or the like. End 56 includes a longitudinally extending bore 60 for slideably receiving rod 38 of leader 36.

Device 10 in the most preferred form further includes a spring 62 slideably received on rod 38 and sandwiched between stop 42 and end 56 of cap 54. Rod 38 extends through bore 60 of end 56, with loop 44 being formed on rod 38 on the side of end 56 opposite spring 62. It can then be appreciated that spring 62 biases cap 54 to slide on leader 36 to abut with loop 44 in a normal condition.

In the most preferred form, each housing half 14 of housing 12 further includes first and second channels 64 extending longitudinally on opposite sides and parallel to axis 24, with channels 64 extending from opposite sides of trough 28 to a diametric extent in planes parallel to surface 22 generally equal to the length of head 40 and spaced from the outer surface of portion 18 and extending from abutment surface 22 to a depth generally equal to one-half of the diameter of head 40. In the form shown, channels 64 have depths less than that of trough 28 and longitudinal extents generally equal to that of trough 28 and are of identical construction in each of housing halves 14. Trough 28 of each half 14 has a diametric extent in planes parallel to surface 22 generally equal to the diameter of rod 38 and the width of eyes 52 of first and second hooks 46. Trough 28 of each housing half 14 extends from abutment surface 22 to a depth generally equal to one-half the height of eyes 52 of hooks 46. Trough 26 of each housing half 14 has a diametric extent in planes parallel to surface 22 generally equal to and for slideable receipt of spring 62 and extends from abutment surface 22 to a depth generally equal to one-half the diametric extent of spring 62.

In the most preferred form where device 10 is in the form of a bait insert apparatus, each housing half 14 includes a bait retaining barb 66 extending at an acute angle from the outer surface of portion 18 in the same plane as ports 30 and 32 and located intermediate port 30 and portion 16.

Assembly of device 10 according to the preferred teachings of the present invention can then be undertaken as follows. Specifically, spring 62 and cap 54 can be slid on rod 38 and loop 44 bent on the end of rod 38 opposite head 40 to retain spring 62 and cap 54 on leader 36. At that time, hooks 46 can be slid on leader 36 by sliding eyes 52 of hooks 46 on head 42 on opposite sides of and abutting with rod 38. Hooks 46 can then be pivoted about head 40 to extend in a non-linear manner from rod 38. At that time, leader 36 with hooks 46 located thereon can be placed on one of the housing halves 14. Specifically, the hook 46 on the same side of axis 24 as ports 30 and 32 of the housing half 14 is extended through ports 30 and/or 32 until head 40 is slideably received in channels 64 and eyes 52 of hooks 46 are slideably received in trough 28, with rod 38 extending longitudinally through troughs 26 and 28. The other housing half 14 can then be positioned such that the other hook 46 extends through ports 30 and/or 32 thereof, with half 14 being moved on such hook 46 until head 40 is slideably received in channels 64 and eyes 52 of hooks 46 are slideably received in trough 28, with rod 38 extending longitudinally through troughs 26 and 28. In the most preferred form, barbs 50 of hooks 46 extend in a direction outwardly from rod 38 when hooks 46 are at an acute angle to rod 38. It should be appreciated that since halves 14 are of identical construction, with the reversal of halves 14 to allow abutment of surfaces 22, ports 30 and/or 32 of the first and second halves 14 are located on opposite sides of axis 24 corresponding to hooks 46 located on opposite sides of rod 38 which extends along axis 24. Halves 14 can then be secured with surfaces 22 in an abutting relation by any suitable means such as adhesive, welding, fusing, or the like. It can then be appreciated that the ends of head 40 extending beyond eyes 52 of hooks 46 are slideably received in channels 64 of the abutting halves 14 to prevent movement of leader 36 in all directions except parallel to axis 24 and with eyes 52 slideably received in troughs 28 in directions parallel to axis 24, with the abutment of eyes 52 with halves 14 adjacent to channels 64 preventing hooks 46 from sliding off of head 40 of leader 36 generally perpendicular to rod 38.

During assembly, cap 54 will be spaced from portion 16, with spring 62 positioned either entirely outside of housing 12 or partially inside troughs 26. Cap 54 can be moved longitudinally with leader 36 and spring 62 being longitudinally slid inside of troughs 26 and 28 until flange 58 of cap 54 abuts with portion 16 of housing 12. Cap 54 in the preferred form can then be threaded upon portion 16. It should then be appreciated that with longitudinal movement of cap 54, leader 36 and spring 62 will also move therewith due to the bias of leader 36 relative to cap 54 by spring 62. However, when eyes 52 of hooks 46 abut with the longitudinal end of troughs 28 opposite portion 16, thus stopping movement of leader 36, further longitudinal movement of cap 54 relative to housing 12 and leader 36 results in further compression of spring 62 between stop 42 and cap 54 with cap 54 in its tightened condition on portion 16, device 10 will be in its normal, static, bait/stowed condition as shown in FIG. 2. Specifically, hooks 46 extend at a minor acute angle to leader 36 approaching parallel to leader 36 and are located inside of the outer surface of housing 12 and specifically with hooks 46 located in troughs 28 and ports 30. It should be noted that spring 62 should have sufficient biasing strength to maintain device 10 in the static condition as shown in FIG. 2 to prevent undesired longitudinal movement of housing 12 relative to leader 36 during baiting of device 10 and/or as device 10 is pulled through the water by a flexible fishing line attached to loop 44 during casting, trolling, and retrieval in the standard manner.

In the event that a fish should "strike" at device 10 with or without bait retained thereon and take part of it into its mouth, the fisherman will typically respond by pulling on the fishing line while housing 12 is in the fish's mouth and/or the fish will pull housing 12 in its mouth relative to the fishing line. Such movement of housing 12 relative to the fishing line will cause leader 36 to slide longitudinally in housing 12 against the bias of spring 62 to a retention condition as shown in FIG. 3. Specifically, as leader 36 moves, hooks 46 will travel outwardly in ports 30 such that barbs 50 are located beyond the outer surface of portion 18. It can then be appreciated that ports 30 act as camming surfaces for hooks 46 such that eyes 52 rotate upon head 40 as leader 36 moves longitudinally relative to housing 12 such that hooks 46 extend at a major acute angle approaching generally perpendicular to leader 36. Hooks 46 move outwardly through ports 30 until spring 62 has been compressed to its minimum length by the abutment of stop 42 and spring 62 with end 56 of cap 54, with hooks 46 extending into the flesh of the mouth of the fish striking housing 12. A fish cannot pull free from hooks 46 because the abutment of stop 42 and spring 62 against cap 54 prevents further longitudinal movement of leader 36 and the angular rotation of hooks 46 about head 40 of leader 36 to an obtuse angle to leader 36 is restricted toward portion 20 by the abutment of hooks 46 with abutment 34 as shown in FIG. 3 and toward portion 16 by the abutment of hooks 46 with ports 30.

After the fish has been landed, it is desired to remove device 10 from the mouth of the fish. Additionally, it is often desired that the fish be returned to the water relatively unharmed. Particularly, device 10 could be removed with hooks 46 in the retention condition of FIG. 3 in a similar manner as prior rigid curved hooks are removed from fish.

Additionally, according to the teachings of the present invention, hooks 46 could be retracted to their bait/stowed condition of FIG. 2 by pushing leader 36 into housing 12 in the biasing direction of spring 62. When leader 36 is so pushed, hooks 46 will retreat inwardly into ports 30 until device 10 reaches the condition shown in FIG. 2. However, it can be appreciated that barbs 50 of hooks 46 are specifically designed to prevent undesired release of the fish and often will not release the fish's mouth even when hooks 46 are retracted back into housing 12 and thus reducing the relative spacing of barbs 50 from the outside surface of portion 18 and from each other. Device 10 according to the preferred teachings of the present invention allows a further, very unique manner of release. Specifically, cap 54 can be released from housing 12 by unscrewing cap 54 in the most preferred form. With the removal of cap 54 from housing 12, leader 36 can be longitudinally moved in the direction of the bias of spring 62 out of housing 12. With the longitudinal movement of leader 36, hooks 46 will rotate upon head 40 from port 30 into intersecting port 32 and into a release condition shown in FIG. 4 extending at an obtuse angle relative to leader 36. In the position of FIG. 4, the change of direction of barbs 50 will have a greater tendency to release the mouth of the fish, especially relatively unharmed. It should be noted that the abutment of hooks 46 in ports 32 of housing 12 as shown in FIG. 4 prevents the further withdrawal of leader 36 from housing 12 so that separation and potential loss of leader 36 and hooks 46 are prevented. After release of the fish, cap 54 with leader 36 biased therein can be moved longitudinally towards housing 12 and again secured to portion 16, with device 10 then again being biased by spring 62 in the bait/stowed condition of FIG. 2 for reuse.

It should then be appreciated that device 10 can be utilized as a live or artificial bait insert apparatus, where device 10 is inserted within the body of the live bait such as a minnow, night crawler, or the like, or of the artificial bait. Such bait should be drawn onto housing 12 sufficiently to engage and be held by barbs 66. It can then be appreciated that the conical shape of portion 20 and the concealment of hooks 46 within the confines of the outer surface of portion 18 of housing 12 is especially advantageous when device 10 is utilized as a bait insert apparatus. It can also be appreciated that as hooks 46 move out of ports 30, hooks 46 will project through the bait and into the mouth of the fish. However, device 10 can also be utilized alone and without the use of bait according to the teachings of the present invention, with the size and proportions of device 10 being varied to increase its usefulness as conditions dictate. It can be appreciated that the exterior surface of housing 12 can be shaped in whatever configuration desired for such an artificial lure including existing or newly designed, with barbs 66 being removed if device 10 is not intended for use as a bait insert apparatus.

Device 10 according to the teachings of the present invention then conceals hooks 46 within bait and/or housing 12 and thus is more attractive to fish and is weedless, i.e. less likely to become snagged on plants and other undesired obstructions present in the water with the fish. Additionally, in its most preferred form, device 10 according to the preferred teachings of the present invention allows ease of release with minimal harm to the fish, a distinct advantage for catch and release fishing. Thus, device 10 according to the teachings of the present invention can be advantageously utilized as a replacement for single piece curved hooks in game fishing.

The particular construction of device 10 according to the preferred teachings of the present invention is believed to be advantageous. Specifically, only a relatively small number of easily manufactured components are involved. Additionally, assembly of such components can be easily and rapidly accomplished, with many components such as hooks 46 on leader 36 and leader 36 including hooks 46 in housing halves 14, slid together and held by the interfit of the components together. Additionally, housing halves 14 are of identical construction such that only a single mold is required, thereby reducing capital costs as well as production and inventory costs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device comprising, in combination: a housing including first and second housing halves secured together; a leader; and first and second hooks having first ends secured to the leader, with the first and second housing halves each including a longitudinally extending abutment surface and a port extending in a plane which is non-parallel to the abutment surface, with at least one of the first and second housing halves further including a longitudinally extending trough for receipt of the leader, with the port extending from the longitudinally extending trough, with the trough having a diametric-extent in planes parallel to the abutment surfaces generally equal to the diameter of the leader combined with the width of the first ends of the hooks and having a depth in planes perpendicular to the abutment surfaces equal to the height of the first ends of the hooks, with the first hook extending through the port of the first housing half and second hook extending through the port of the second housing half, with the hooks and the leader being retained in the trough and ports in a non-separable manner from the housing halves when the housing halves are secured together with the abutment surfaces in an abutting relation.

2. The device of claim 1 wherein the leader is longitudinally movable in the longitudinally extending trough, with the hooks being pivotably secured to the leader for slideable movement in the ports with longitudinal movement of the leader.

3. The device of claim 2 wherein the leader is longitudinally movable in the housing halves with the hooks extending at an acute angle to the leader halves with the hooks extending at an obtuse angle substantially greater than 90° to the leader.

4. The device of claim 3 further comprising, in combination: means removable secured to the housing for preventing the leader from longitudinally moving in the housing with the hooks extending at the obtuse angle to the leader.

5. The device of claim 4 wherein the leader is longitudinally movable in the housing between a first condition with the hooks extending at a minor acute angle approaching generally parallel to the leader and a second condition with the hooks extending at a major acute angle approaching generally perpendicular to the leader.

6. The device of claim 5 wherein the leader further includes a stop; and wherein the device further comprises, in combination: means for biasing the leader from the second condition to the first condition comprising a spring sandwiched between the stop of the leader and the preventing means.

7. The device of claim 6 wherein the preventing means comprises a cap threadably received on the housing.

8. The device of claim 2 wherein the leader is longitudinally movable in the housing between a first condition with the hooks extending at a minor acute angle approaching generally parallel to the leader and a second condition with the hooks extending at a major acute angle approaching generally perpendicular to the leader.

9. The device of claim 8 further comprising, in combination: means for biasing the leader from the second condition to the first condition.

10. Device comprising, in combination: a housing including first and second housing halves secured together; a leader; and first and second hooks secured to the leader, with the first and second housing halves each including a longitudinally extending abutment surface and a port extending in a plane which is non-parallel to the abutment surface, with at least one of the first and second housing halves further including a longitudinally extending trough for receipt of the leader, with the port extending from the longitudinally extending trough, with the first hook extending through the port of the first housing half and the second hook extending through the port of the second housing half, with the hooks and the leader being retained in the trough and ports in a non-separable manner from the housing halves when the housing halves are secured together with the abutment surfaces in an abutting relation; wherein the leader extends along a longitudinal center axis, and wherein the port extends from the trough radially spaced from the longitudinal center axis in each of the housing halves, with the first and second housing halves being reversed when secured together to place the ports of the first and second housing halves on opposite sides of the longitudinal center axis.

11. The device of claim 10 wherein the leader includes a head extending on opposite sides of and generally perpendicular to the leader; wherein the hooks each include an eye slideably mounted on the head, with the trough receiving the eyes of the hooks slideably mounted on the head and preventing sliding of the eyes from the head when the housing halves are secured together.

12. The device of claim 11 wherein the leader is longitudinally movable in the longitudinally extending trough, with the hooks being pivotably secured to the leader for slideable movement in the ports with longitudinal movement of the leader.

13. The device of claim 12 wherein at least one of the housing halves further includes first and second channels extending longitudinally on opposite sides of the longitudinally extending trough, with the channels having a depth less than the depth of the longitudinally extending trough, with the head extending beyond the eyes of the hooks and being slideably received in the first and second channels.

14. The device of claim 13 wherein each of the first and second housing halves include the longitudinally extending trough and the first and second channels of identical construction.

15. The device of claim 14 wherein the first and second housing halves are of identical construction.

16. Device comprising, in combination: a leader; at least a first hook pivotably related to the leader and having a free end, with the free end of the hook including a barb extending downwardly and outwardly therefrom; and means for mounting the leader for longitudinal movement between a retention condition with the hook extending at an acute angle to the leader and a release condition with the hook extending at an obtuse angle substantially greater than 90° to the leader.

17. The device of claim 16 wherein the mounting means mounts the leader for longitudinal movement between a stowed condition with the hook extending at a minor acute angle approaching generally parallel to the leader and the retention condition with the hook extending at a major acute angle approaching generally perpendicular to the leader.

18. The device of claim 17 further comprising, in combination: means for biasing the leader from the retention condition to the stowed condition.

19. The device of claim 16 further comprising, in combination: means removably secured to the housing for preventing the leader from longitudinally moving to the release condition with the hook extending at the obtuse angle to the leader.

20. The device of claim 19 wherein the preventing means comprises a cap threadably received on the housing.

21. The device of claim 16 wherein the mounting means comprises a housing including a longitudinally extending trough for slideable receipt of the leader and a port intersecting with the trough for slideable receipt of the hook.

22. The device of claim 21 wherein the leader includes a head extending generally perpendicular to the leader, with the hook including an eye for slideable and pivotable movement on the head, with the trough slideably receiving the leader and the eye of the hook for longitudinal movement but preventing sliding of the eye on the head generally perpendicular to the leader.

23. The device of claim 22 wherein the head extends on opposite sides of the leader; and wherein the housing further includes first and second channels extending longitudinally on opposite sides of the trough for slideably receiving the head, with the depth of the channels being less than the depth of the longitudinally extending trough.

24. Device comprising, in combination: a housing including first and second housing halves secured together; a leader; first and second hooks secured to the leader, with the first and second housing halves each including a longitudinally extending abutment surface and a port extending in a plane which is non-parallel to the abutment surface, with at least one of the first and second housing halves further including a longitudinally extending trough for receipt of the leader with the leader being longitudinally movable in the longitudinally extending trough, with the port extending from the longitudinally extending trough, with the first hook extending through the port of the first housing half and the second hook extending through the port of the second housing half with the hooks being pivotably secured to the leader for slideable movement in the ports with longitudinal movement of the leader, with the hooks and the leader being retained in the trough and ports in a non-separable manner from the housing halves when the housing halves are secured together with the abutment surfaces in an abutting relation wherein the leader is longitudinally movable in the housing between a first condition with the hooks extending at a minor acute angle approaching generally parallel to the leader and a second condition with the hooks extending at a major acute angle approaching generally perpendicular to the leader; and means removably secured to the housing for preventing the leader from longitudinally moving in the housing beyond the second condition with the hooks extending at the obtuse angle to the leader.

25. The device of claim 24 wherein the leader further includes a stop; and wherein the device further comprises, in combination: means for biasing the leader from the second condition to the first condition comprising a spring sandwiched between the stop of the leader and the preventing means.

26. The device of claim 25 wherein the preventing means comprises a cap threadably received on the housing.

27. Device comprising, in combination: a housing including first and second housing halves secured together; a leader having a head extending generally perpendicular to the leader; and first and second hooks each including an eye for slideable and pivotable movement on the head, with the first and second housing halves each including a longitudinally extending abutment surface and a port extending in a plane which is non-parallel to the abutment surface, with at least one of the first and second housing halves further including a longitudinally extending trough for slideable receipt of the leader, with the port extending from the longitudinally extending trough, with the first hook extending through the port of the first housing half and the second hook extending through the port of the second housing half, with the trough slideably receiving the leader and the eyes of the hooks for longitudinal movement but preventing sliding of the eyes on the head generally perpendicular to the leader, with the hooks and the leader being retained in the trough and ports in a non-separable manner from the housing halves when the housing halves are secured together with the abutment surfaces in an abutting relation.

28. The device of claim 27 wherein the head extends on opposite sides of the leader; and wherein the housing further includes first and second channels extending longitudinally on opposite sides of the trough for slideably receiving the head, with the depth of the channels being less than the depth of the longitudinally extending trough.

* * * * *